7385X
W. Cole.
Pulp Washer.
No.
Patented Jan. 23, 1833.
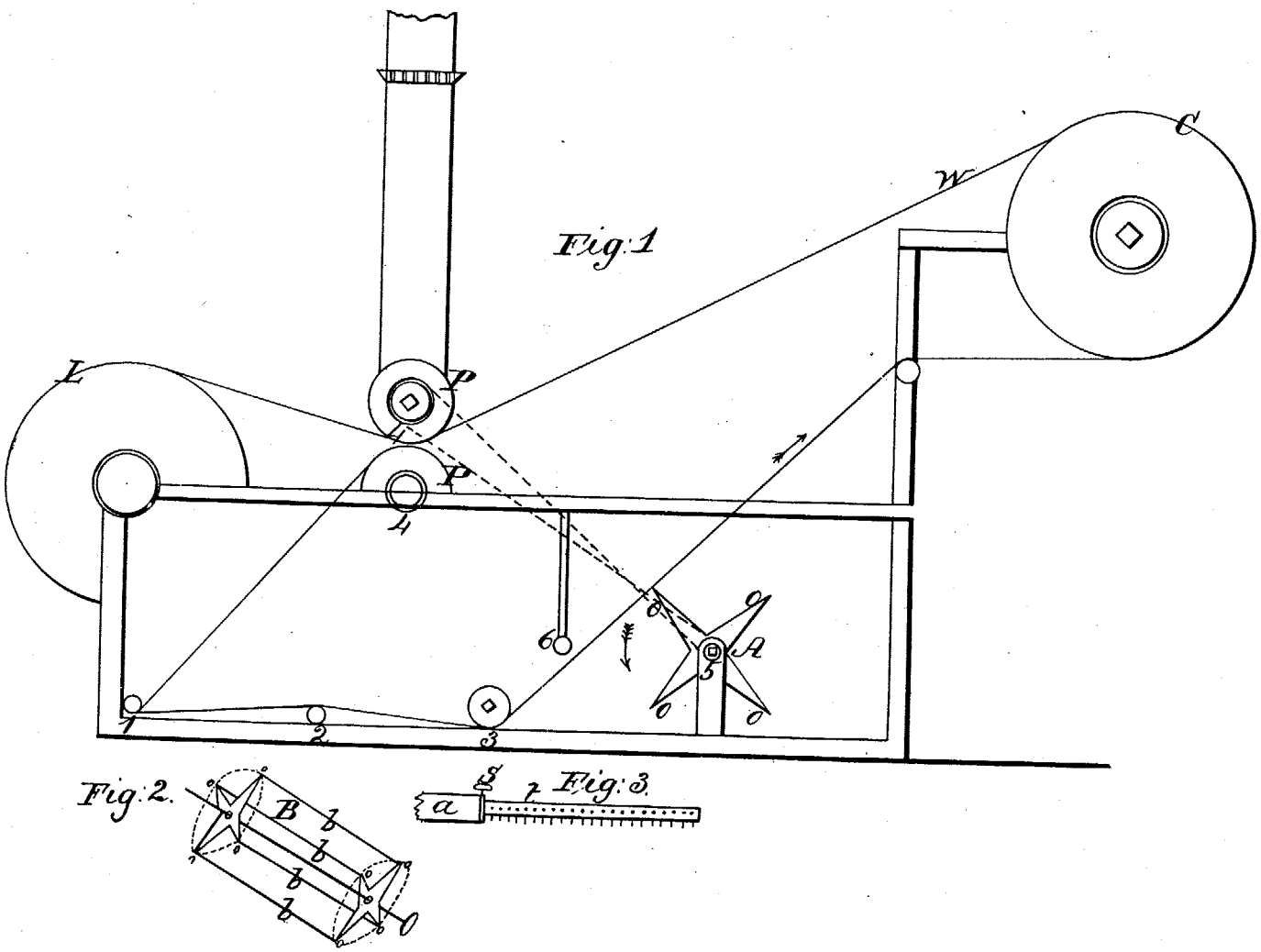

73835X Jan 23, 1833 417

William Cole of Lee, Massachusetts.
Letters Patent.

Dated January 23d. 1833.

The Schedule referred to in these Letters Patent, and making part of the same, containing a description in the words of the said William Cole himself, of his Improvement in washing felts in a machine for making paper, called a "Felt Washer".

---

To all to whom these presents shall come: Be it known, that I, William Cole of Lee, County of Berkshire & Commonwealth of Massachusetts, have invented a new and useful improvement in washing felts in the machine for making paper, and that the following and the annexed drawing, is a full and exact description of the construction and operation of the same, as invented or improved by me.

The annexed drawing represents that part of a machine for making paper by water or other power to which the said improvement belongs. C, the Coucher cylinder around which W, the web or sheet of paper is communicated on a felt onto the cylinder L, called the "Lay boy," also between cylinders or press rolls, marked P, P, thence passes back to C, under roller 1, over roller 2, and under roller 3. And on its way from this last roller.

What I claim as new and as my own invention or discovery in the above described machine, and for the use of which, I ask an exclusive privilege, is a Felt Washer, which is constructed as follows, as per A, in the drawing, and as per B, in the separate drawing. It is a float wheel of four arms at right angles on each end of a shaft, of sufficient length for the width of the felt or web, and a float or bar framed or fastened on the end of each arm, as at O, O, O, O, in each of the aforesaid drawings. The floats or bars as b, b, b, b, in Fig. 2. This wheel to be placed under the felt or web in such a position, that the floats or bars shall strike or beat the felt underneath, in a contra as the felt ascends to C, that is towards 3. The power applied to motion this Felt Washer may be in various ways, and quicker or slower; one way by a cross band from wheel No. 4, on the end of shaft L, to wheel No. 5, on the end of shaft A, the Felt Washer.

7385X

But, in order that the Felt Washer may do its perfect work a tin or other tube of small or larger caliber, thickly perforated with small holes, must be placed the opposite side of the felt, near where the floats of the wheel strike or beat the felt as at No. 6; into this tube must be forced water so that issue thro' these holes directly on the felt, which may be done by aqueduct, pump or otherwise, and stopped at pleasure; see Fig. 3; — a, aqueduct, 5, stop cock, 6, tube.

I only claim concerning this tube, the relative situation here placed in connection with the felt washer; yet it is an improvement in this respect, and may be considered a part of this invention. This Improvement and Invention may be used in a Cylinder, Trader, or any other machine mill, and will so cleanse the felt as to supersede the necessity of removing the same until it is fully worn out; all which is considered a very great saving in, and fine acquisition to the art of paper making; of which the Inventor professes to be well acquainted.

Witnesses
Ransom Hinman
William Porter Jr.

William Cole

[illegible]

Dr. in Portfolio